Nov. 5, 1940.        H. C. BOWEN        2,220,809
AUTOMATIC ADJUSTER FOR BRAKES
Filed Dec. 23, 1938
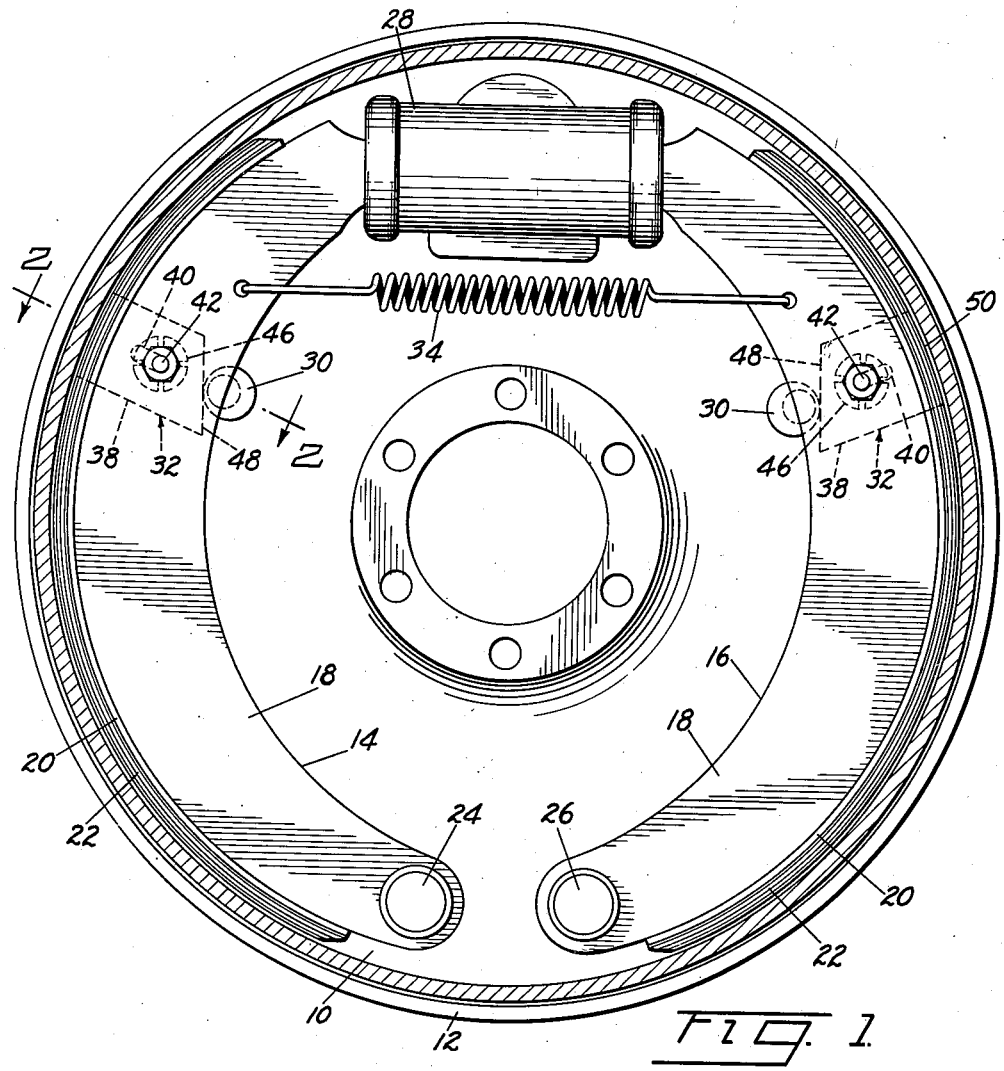
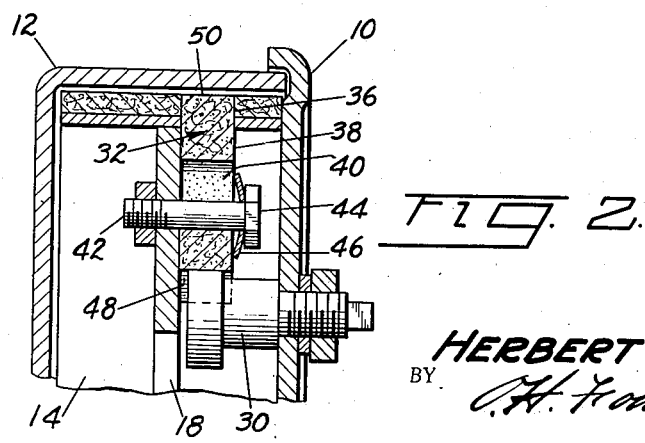
INVENTOR.
HERBERT C. BOWEN
BY
ATTORNEY.

Patented Nov. 5, 1940

2,220,809

UNITED STATES PATENT OFFICE 2,220,809

AUTOMATIC ADJUSTER FOR BRAKES

Herbert C. Bowen, Detroit, Mich., assignor to Hydraulic Brake Company, Detroit, Mich., a corporation of California Application December 23, 1938, Serial No. 247,517

5 Claims. (Cl. 188—79.5)

This invention relates to brakes, and more particularly to means for automatically adjusting the braking elements of brakes.

Broadly the invention comprehends a simple and inexpensive structure operative to automatically adjust the braking elements of a brake so as to compensate for wear of the friction linings on the braking elements.

An object of the invention is to provide an automatic adjuster for brakes operative to support a braking element in proper spaced relation to a movable element when the braking element is at rest.

Another object of the invention is to provide an automatic adjuster for a braking element controlled by wear of the friction lining on the braking element.

A further object of the invention is to provide an automatic adjuster for the braking element of a brake constructed to avoid maladjustment thereof due to the tension of the retractile spring for the braking element.

A feature of the invention is a single element frictionally clamped to the braking element.

Another feature of the invention is a non-metallic element having a low coefficient of friction mounted on and movable relative to the braking element and cooperating with an element to be braked.

Another feature of the invention is a single non-metallic element frictionally clamped to a braking element and adapted to alternately cooperate with a movable element and a stop.

Yet another feature of the invention is a single non-metallic element having one of its ends arcuate and its other end beveled.

Other objects and features of the invention will appear from the following description taken in connection with the accompanying drawing forming a part of this specification, and in which—

Fig. 1 is a vertical sectional view of a conventional two-shoe brake illustrating the invention as applied; and Fig. 2 is a sectional view substantially on line 2—2, Fig. 1.

Referring to the drawing for more specific details of the invention, 10 represents a fixed support or backing plate, and 12 a rotatable drum associated with the backing plate. A pair of corresponding interchangeable friction elements or shoes 14 and 16 are arranged on the backing plate. Each of the shoes includes a web 18 supporting a rim 20 having suitably secured thereto a friction lining 22 for cooperation with the drum.

The articulate ends of the shoes 14 and 16 are pivotally mounted on anchors 24 and 26 arranged in spaced relation to one another on the backing plate, and a fluid pressure actuated motor 28 also arranged on the backing plate is connected to the force-applying ends of the shoes.

Adjustable retractile stops 30 suitably arranged on the backing plate serve, in conjunction with automatic adjusters 32 mounted on the shoes, to support the shoes in proper spaced relation to the drum when the shoes are at rest or in retracted position, and a conventional retractile spring 34 connecting the shoes serves to return the shoes to the stops upon conclusion of a braking operation.

The rim 20 and lining 22 of each of the shoes 14 and 16 are slotted as at 36, and the automatic adjuster 32 is slidable in this slot. The automatic adjuster includes a non-metallic block or plate 38 of a suitable material having a low coefficient of friction. The plate is longitudinally slotted as indicated at 40 for the reception of a stud or bolt 42 mounted in the web 18 of the shoe, and sleeved on this bolt between its head 44 and the plate 38 is a spring washer 46 serving to frictionally clamp the plate 38 to the web 18.

One end of the plate 38 is beveled as indicated at 48, and the other end of the plate has an arcuate face 50 complementary to the face of the friction lining 22 on the shoe. The beveled end 48 of the plate cooperates with the adjustable stop 30, and the arcuate face 50 on the other end of the plate cooperates with the drum 12.

In a normal operation, upon energization of the fluid pressure actuated motor 28, the braking elements 14 and 16 are moved to engage the friction linings 22 thereon with the drum 12, and concomitantly therewith the adjusters 32 carried by the braking elements also engage the drum. The linings 22 on the braking elements are subjected to the usual wear incidental to this operation, and the wear on the adjusters, because of their low coefficient of friction, is negligible. This differential of wear results in relative movement between the braking elements and the adjusters, and constant maintenance of the arcuate faces 40 of the adjusters contiguous with the linings 22 of the braking elements.

The adjusters 32 are frictionally clamped to the braking elements 14 and 16, and, consequently, upon the completion of a braking operation and return of the braking elements to their retracted position under the influence of the retractile spring 34 connecting the braking elements, the adjusters 32 engage the retractile stops 30 and support the braking elements in proper spaced relation to the drum.

The relative movement between the braking elements and the adjusters 32 is opposed by frictional resistance introduced by a differential in the frictional coefficient of the webs 18 of the braking elements and the adjusters 32, augmented by the tension of the spring washers 46 serving to clamp the adjusters to the webs 18.

The frictional resistance introduced between the webs 18 of the braking elements and the adjusters 32 is ordinarily sufficient to bind the adjusters to the webs with sufficient force to support the braking elements in proper spaced relation to the drum when the adjusters 32 are in engagement with the retractile stops 30.

To inhibit relative movement between the braking elements and the adjusters 32 when the adjusters engage the retractile stops 30, the adjusters have beveled ends 48 for engagement with the stops 30 so that the load of the braking element may be taken bias to the paths of movement of the adjusters. This is highly desirable because of the tension on the retractile spring 34 tending to return the braking elements to retracted position with considerable force, which would otherwise be a direct axial thrust on the adjusters.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a rotatable drum, a braking element for cooperation therewith, a retractile stop associated with the braking element, and a member frictionally clamped to and movable transversely of the braking element having an end adapted to engage the drum and a beveled end adapted to engage the stop.

2. A brake comprising a rotatable drum, a braking element for cooperation with the drum, a retractile stop associated with the braking element, and a member frictionally clamped to the braking element having an arcuate end adapted to engage the drum and a beveled end adapted to engage the stop.

3. A brake comprising a rotatable drum, a braking element for cooperation therewith, a retractile stop associated with the element, a member frictionally clamped to the element and movable transversely thereof, an arcuate part on the member adapted to engage the drum and a beveled part on the member adapted to engage the stop so as to support the member angularly to its path of movement.

4. A brake comprising a rotatable drum, a braking element having a friction lining for cooperation with the drum, an adjustable retractile stop associated with the braking element, and a member frictionally clamped to the braking element having a different coefficient of friction from that of the lining on the braking element, said member having an arcuate end for cooperation with the drum and a beveled end for cooperation with the stop.

5. A brake comprising a rotatable drum, a braking element for cooperation therewith, a retractile stop for the element, a retractile spring for the element, a member frictionally clamped to the element and movable transversely thereof, a part on the member adapted to engage the drum, and a beveled part on the member adapted to engage the stop for supporting the member angularly to its path of movement and angularly to the direction of the force imposed on the element by the spring.

HERBERT C. BOWEN.